United States Patent [19]

Yuino et al.

[11] Patent Number: 5,630,714
[45] Date of Patent: May 20, 1997

[54] PROCESS FOR CONTROLLING COMBUSTION OF BURNERS IN FURNACE AND AN APPARATUS THEREFOR

[75] Inventors: Tatsuya Yuino, Nagoya; Kazuhiro Miyahara, Yokkaichi; Toyoshiro Miyajima, Tajimi, all of Japan

[73] Assignee: NGK Insulators, Ltd., Japan

[21] Appl. No.: 411,314

[22] Filed: Mar. 28, 1995

[30] Foreign Application Priority Data

Mar. 28, 1994 [JP] Japan .................................. 6-057602

[51] Int. Cl.$^6$ ................................................ F27D 19/00
[52] U.S. Cl. ........................... 432/36; 452/18; 452/19; 452/37; 452/39; 452/51
[58] Field of Search ............................ 432/18, 19, 36, 432/37, 39, 51

[56] References Cited

U.S. PATENT DOCUMENTS 4,480,992  11/1984  Okamoto .

FOREIGN PATENT DOCUMENTS 0368033  5/1990  European Pat. Off. .
1160926  8/1969  United Kingdom .

OTHER PUBLICATIONS

Patent Abstracts of Japan, vol. 18, No. 628 (M–1713).
Patent Abstracts of Japan, vol. 12, No. 137 (M–690).

*Primary Examiner*—Henry A. Bennett
*Assistant Examiner*—Siddharth Ohri
*Attorney, Agent, or Firm*—Parkhurst, Wendel & Burr, L.L.P.

[57] ABSTRACT

A process for controlling combustion of burners arranged in a plurality of respective control zones divided in a furnace, includes the step of repeating a cycle of successively subjecting the burners to combustion for a short time. At least one temperature sensor is fitted in each control zone, a time period during which each burner is subjected to combustion is controlled according to a difference between a temperature detected by the corresponding temperature sensor and a preset temperature in a respective control zone. An apparatus is also disclosed for effecting such a controlling process.

4 Claims, 7 Drawing Sheets

PROCESS FOR CONTROLLING COMBUSTION OF BURNERS IN FURNACE AND AN APPARATUS THEREFOR

BACKGROUND OF THE INVENTION (1) Field of the Invention

The present invention relates to a process for controlling combustion of burners attached to a furnace such as a firing kiln and an apparatus therefor.

(2) Related Art Statement

In order to control combustion of burners, it was conventionally a common process to proportionally control the output of each burner depending upon a temperature inside a furnace in the state that burning is continuously being effected through all burners. However, if burning is effected through the burners in the state that combustion output is throttled, an amount of a combustion gas is lacking, and the temperature distribution in the furnace largely varies. Consequently, a large amount of air needs to be forcedly fed into the furnace even in the state that the combustion output is throttled. An increased amount of fuel for the burners needs is required to heat the fed air.

Figure 6:
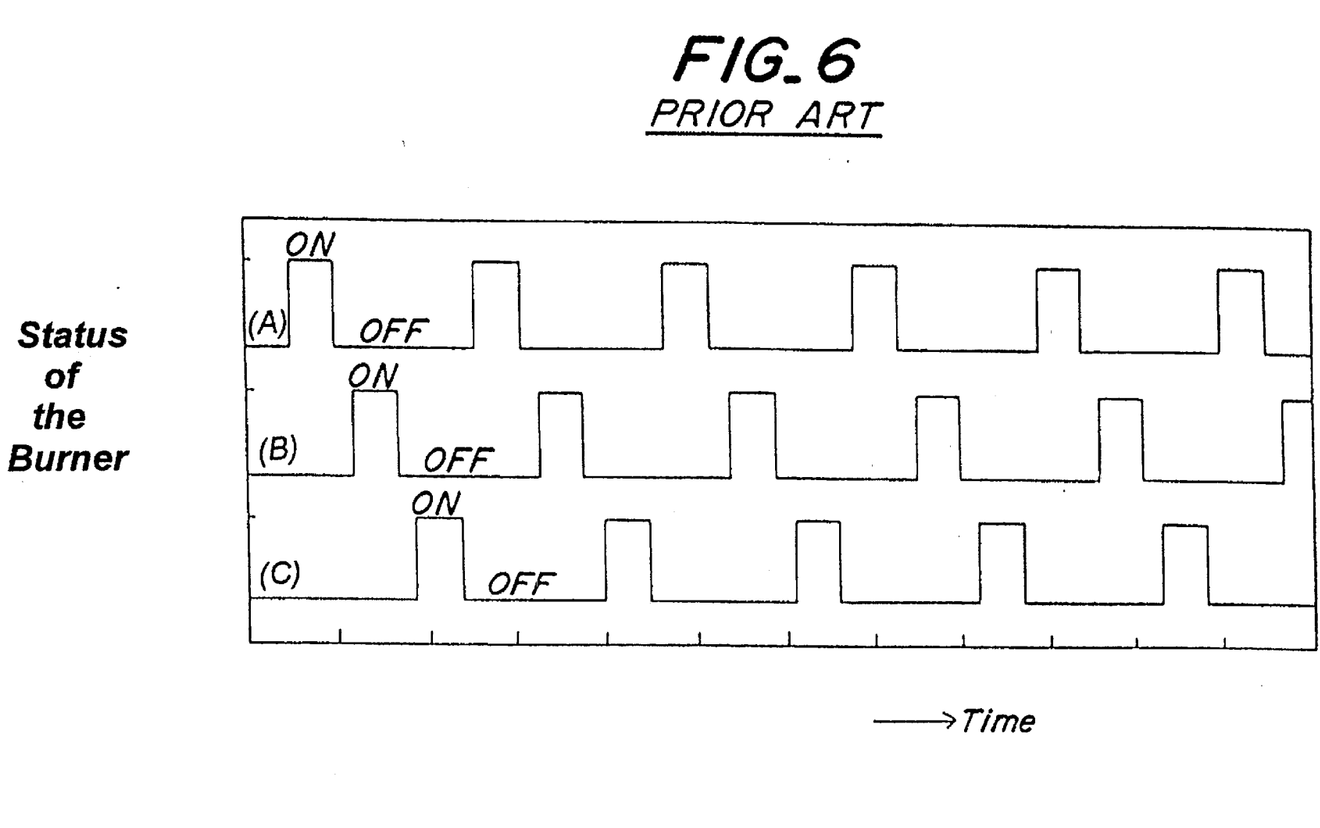
FIG. 6 is a time chart for illustrating the conventional burner combustion-controlling process.

In order to solve the above problem, a burner combustion-controlling process has been developed, which can control the temperature inside the furnace without throttling the combustion output through each of the burners. According to this process, the interior of the furnace is divided into a plurality of control zones, burners are arranged in the respective control zones, and successively subjected to combustion for a short time, while the control zones are successively employed as a combustion zone, and such a combustion cycle is repeated. FIG. 6 shows this process in the form of a time chart. For example, the interior of the furnace is divided into three control zones at upper, middle and lower stages. The upper stage burner is subjected to combustion for the first 6 seconds, then the middle stage burner is subjected to combustion for the next 6 seconds, and the lower stage burner is thereafter subjected to combustion for the succeeding 6 seconds, as represented in plots (A), (B) and (C), respectively. This cycle is repeated. Since each burner is subjected to combustion, although intermittently, without throttling its combustion output, this process has an advantage in that a large amount of air need not be fed inside the furnace. Further, the amount of generated heat through all the burners can be controlled by adjusting a time period from a point of time at which combustion through a certain stage burner is stopped to a point of time at which combustion is successively started through another stage burner.

Figure 7:
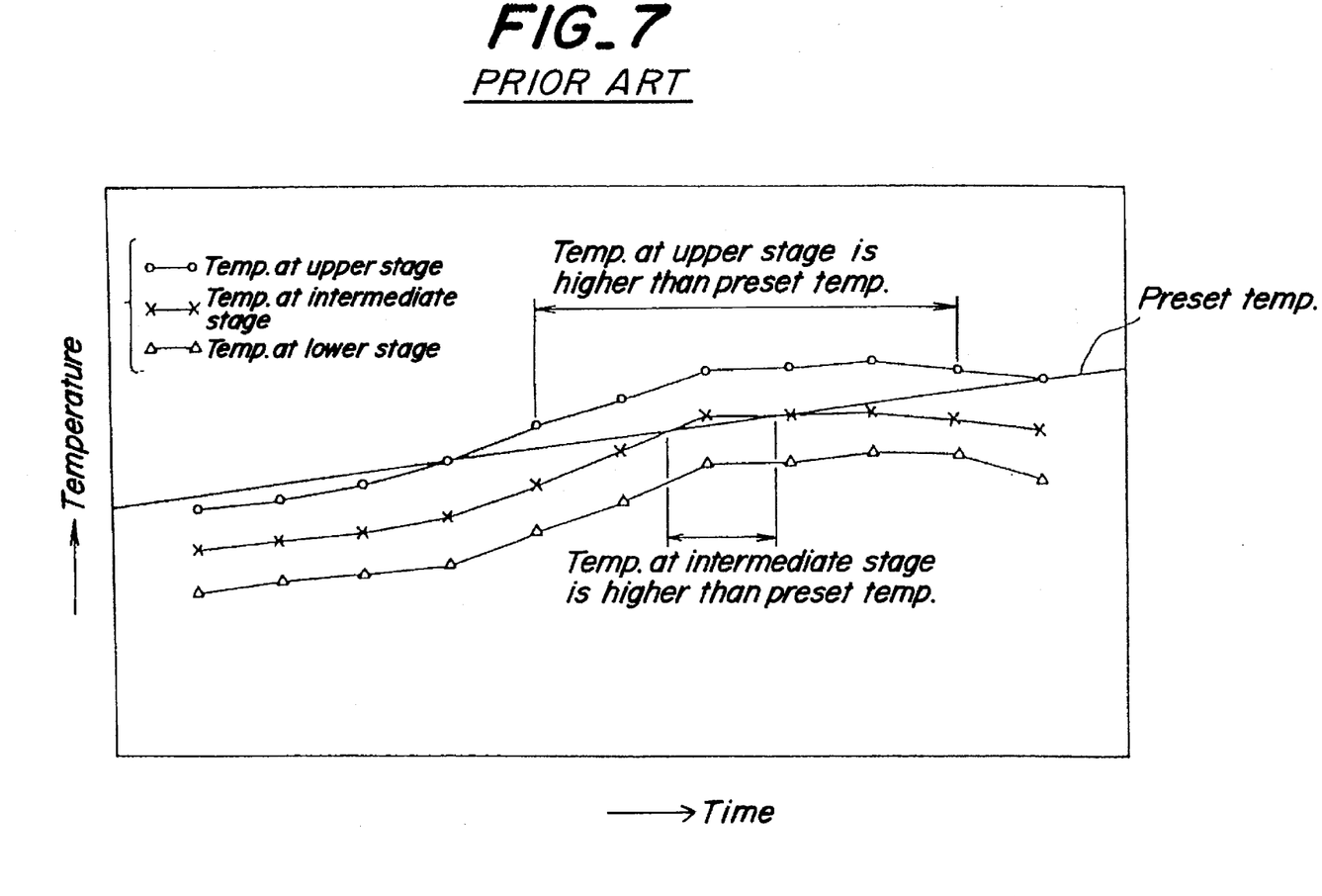
FIG. 7 is a graph illustrating the temperature inside the furnace when the conventional burner combustion-controlling process is employed.

On the other hand, it was clarified that when the above burner combustion-controlling process was applied to an actual furnace, the following problem occurred. That is, according to this burner combustion-controlling process, the burners in all the control zones are subjected to combustion in the same pattern depending upon the temperature inside the furnace. Thus, as shown in FIG. 7, it may happen that when the middle stage temperature approaches a preset temperature, the temperature in the upper stage section exceeds its preset temperature. As is understood from this, it was clarified that the above conventional intermittent burner combustion-controlling process cannot exhibit sufficient effect in reducing variations in the temperature distribution inside the furnace.

SUMMARY OF THE INVENTION

It is an object of the present invention to solve the above-mentioned problem, and the invention has been accomplished to provide a burner combustion-controlling process which makes it possible to reduce variations in the temperature distribution in the furnace, without deteriorating the advantages attained by the conventional intermittent burner combustion-controlling process.

It is another object of the present invention to provide an apparatus for effecting such a burner combustion-controlling process.

A first aspect of the burner combustion-controlling process of the present invention, which has been made to solve the above problem, is characterized in that the interior of the furnace is divided into a plurality of control zones, at least one burner is arranged in each control zone and successively subjected to combustion for a short time, and this cycle is repeated, wherein at least one temperature sensor is fitted in each control zone, a time period during which combustion is effected through each burner is adjusted depending upon a difference between a temperature detected by the temperature sensor and a preset temperature in a respective control zone.

A second aspect of the burner combustion-controlling process of the present invention is characterized in that the interior of the furnace is divided into a plurality of control zones, at least one burner is arranged in each control zone and successively subjected to combustion for a short time, and this cycle is repeated, wherein at least one temperature sensor is fitted in each control zone, a time period during which combustion is effected through each burner is adjusted depending upon a difference between a temperature detected by the temperature sensor and a preset temperature, and if a detected temperature of a certain zone exceeds a preset temperature, combustion is skipped for the burner in said certain zone for a given time period during which said burner is to be subjected to combustion.

The burner combustion-controlling apparatus according to the present invention is adapted to control combustion through burners attached to a plurality of respective control zones that are defined by dividing an interior of a furnace, through repeating a cycle of successively subjecting the burners to combustion for a short time. The burner combustion-controlling apparatus includes means for feeding air to each of the burners, means for feeding a fuel gas to each of the burners, adjusting means for adjusting the air feeding means and the fuel feeding means, means for detecting a temperature in each of the control means, comparison means for memorizing a preset temperature in each of the control zone, comparing the preset temperature with the detected temperature in each of the control zones, and outputting a signal based on a comparison result, and intermittent combustion-controlling means for receiving said signal from the comparison means and outputting a signal to a burner-controlling means, said burner-controlling means adapted for receiving said signal from said intermittent combustion-controlling means and outputting a signal to the adjusting means to control feeding air and the fuel gas to each of the burners, the intermittent combustion-controlling means being adapted to output signals to said burner controllers to effect subjecting the burners to combustion in a preset circulating manner at a given interval and to adjust a time period during which combustion is effected through each burner, depending upon a difference between the temperature of said detecting means and the preset temperature. According to this apparatus, if there is a control zone in which the detected temperature exceeds the preset temperature, the burner in this control zone may be skipped through combustion for a given time period during which the burner is to be subjected to combustion.

According to the first aspect of the present invention, the temperature sensors are attached to a plurality of the respective control zones to detect the temperatures therein, and the time period during which each burner is subjected to combustion is adjusted depending upon the difference between the temperature detected by the temperature sensor and the preset temperature. Consequently, variations in the temperature distribution inside the furnace can be reduced. In addition, the advantage possessed by the above conventional process that the burners provided in the respective plural control zones are successively subjected to combustion for a short time without throttling the combustion output is not deteriorated.

According to the second aspect of the present invention, the temperature sensors are attached to a plurality of the respective control zones to detect the temperatures therein, and if the detected temperature in a certain control zone exceeds the preset temperature, combustion to be effected for a given time period is skipped for the burner in this certain control zone. Thus, as in the case of the first aspect of the present invention, the variations in the temperature distribution inside the furnace can be reduced.

These and other objects, features and advantages of the invention will be appreciated upon reading the following description of the invention when taken in conjunction with the attached drawings, with the understanding that some modifications, variations and changes of the same could be easily made by the skilled person in the art.

BRIEF DESCRIPTION OF THE DRAWINGS

For a better understanding of the invention, reference is made to the attached drawings wherein.

DETAILED DESCRIPTION OF THE INVENTION

In the following, the present invention will be explained in more detail with reference to embodiments shown in the drawings.

Figure 1:
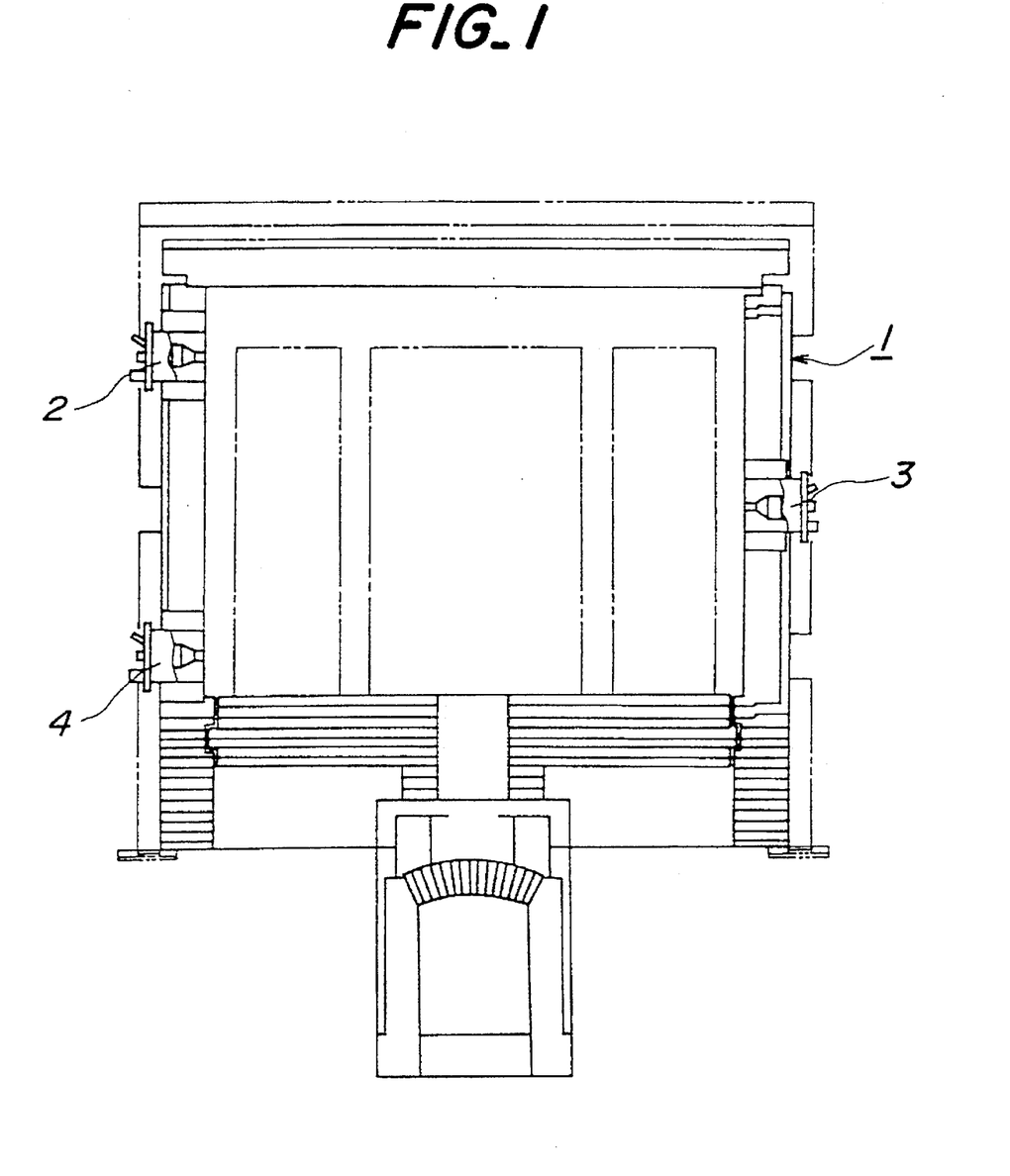
FIG. 1 is a sectional view of a furnace.

In FIG. 1, a reference numeral 1 is a furnace, and three burners 2, 3 and 4 are attached to the furnace in the state that the burners 2 and 4 are opposed to the burner 3. In this embodiment, the interior of the furnace body is divided into three upper, middle and lower stage control zones, and one burner is arranged in each control zone.

Figure 2:
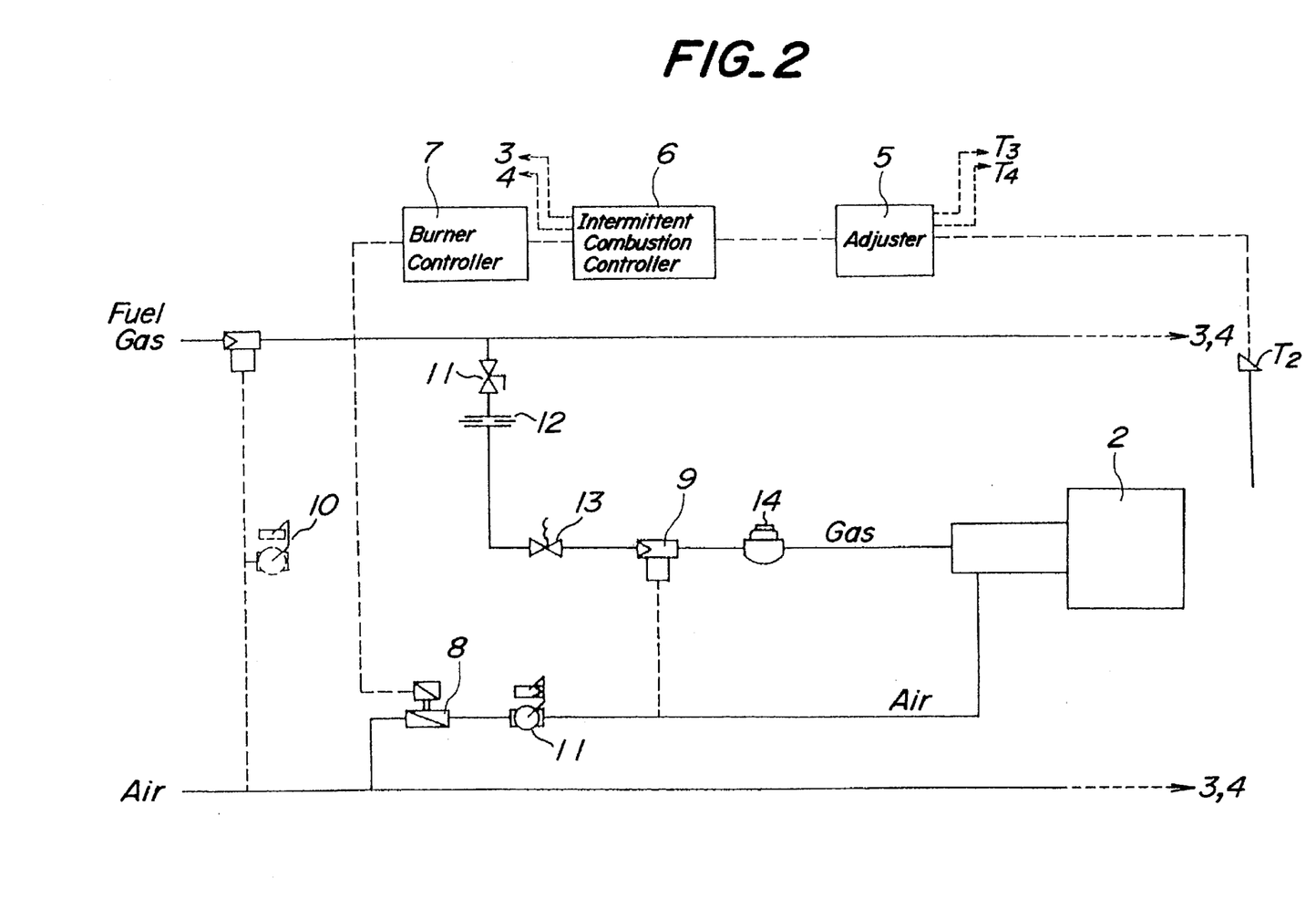
FIG. 2 is a block diagram of a burner combustion-controlling apparatus.

FIG. 2 shows a burner combustion-controlling apparatus. Only a related portion of the burner 2 in the the upper stage control zone is shown. In FIG. 2, $T_2$ is a temperature sensor, and reference numerals 5, 6 and 7 show an adjuster, an intermittent combustion controller, and a burner controller, respectively. The temperature sensor $T_2$ detects the temperature in the upper stage control zone, and outputs a detected temperature signal to the adjuster 5. The adjuster preliminarily stores preset temperatures for the respective control zones, compares the detected temperature with a preset temperature based on the signal from the temperature sensor $T_2$, and outputs a comparison result to the intermittent combustion controller 6. The intermittent combustion controller 6 preliminarily stores combustion cycling data including the combustion order, the combustion interval, the combustion duration, etc. for the burners, and receives the comparison results from the adjuster 5 and shortens the combustion duration for the burner in the control zone to be adjusted in temperature. The burner controller 7 outputs a control signal to a control valve 8.

The control valve 8 is intermittently opened or closed upon receipt of a control signal outputted from the burner controller 7, so that air is fed to the upper stage burner 2 through the control valve 8. Interlockingly with this, a fuel gas is fed through a pressure-equalizing valve 9 to the burner 2 where combustion is effected. Signals are sent to the burner 3 in the control zone at the intermediate stage from the intermittent burner controller 6 as well as to the burner 4 in the control zone at the lower stage, so that similar control is effected.

A reference numeral 10 is a pressure-equalizing valve which is always opened during operating the apparatus according to the present invention. This valve functions as an ordinary pressure-equalizing valve which regulates the flow rate of a fuel gas based on the pressure of air. Reference numerals 11 and 12 are a hand cock and a flow meter, respectively. Reference numerals 13 and 14 are a solenoid valve for safety purpose and a pressure-equalizing valve, respectively.

Figure 3:
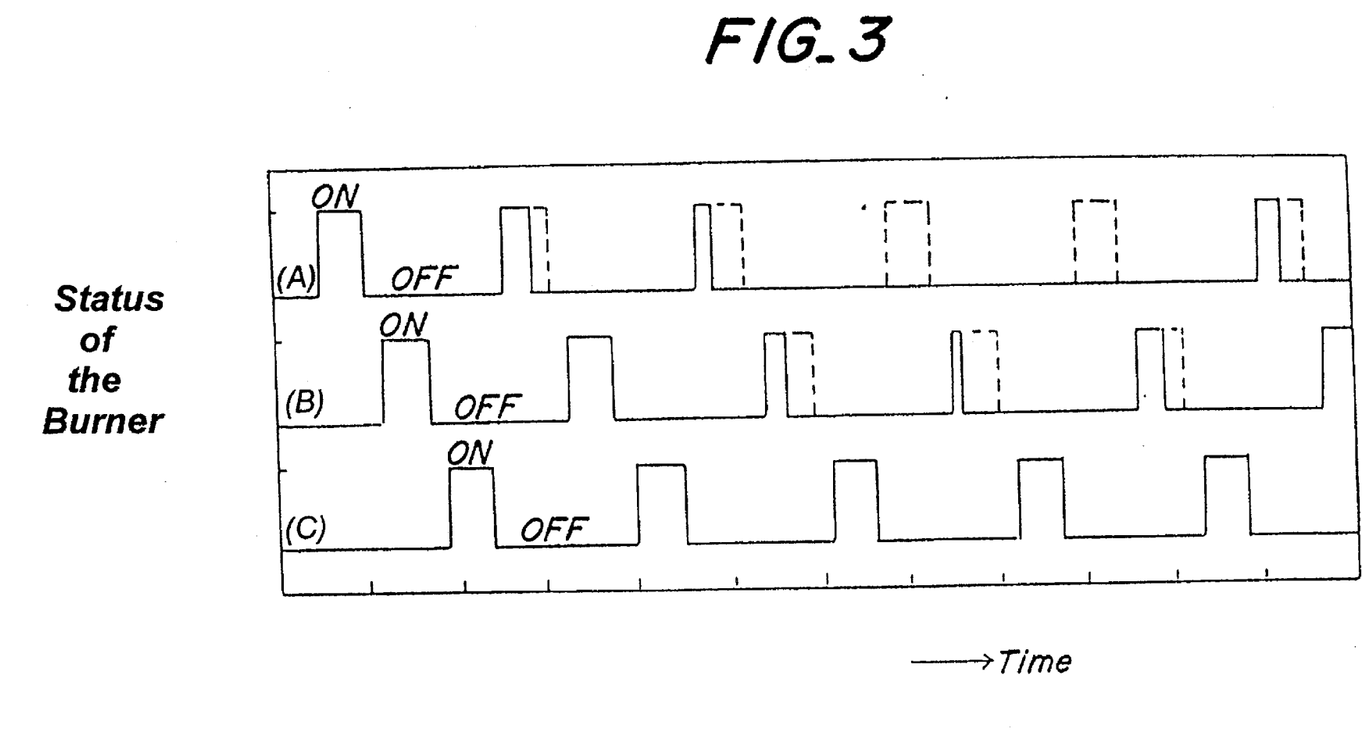
FIG. 3 is a time chart for illustrating a burner combustion-controlling process according to a first aspect of the present invention.

In the conventional burner combustion-controlling method mentioned before, the burner in each control zone is subjected to combustion according to the same pattern as shown in FIG. 6. On the other hand, according to the first aspect of the present invention, the temperature sensor is fitted in each control zone, the time period during which the burner is subjected to combustion is adjusted based on a difference between the temperature detected by the temperature sensor and a preset temperature. FIG. 3 illustrates a concrete example of such controlling. For example, if the temperature of the control zone at the upper stage exceeds the upper limit of a preset temperature range, the time period during which the burner 2 at the upper stage is subjected to combustion is gradually shortened, whereas if the detected temperature becomes lower than the lower limit of the preset temperature range, the shortened time period is restored to the original preset temperature, as represented by plot (A). Further, a similar controlling is illustrated with respect to the burner 3 at the intermediate stage, as represented by plot (B). Contrary to the conventional controlling process, according to the present invention, only the combustion time period is varied for each of the necessary combustions, but the overall intermittent combustion cycle is maintained as a whole.

Figure 4:
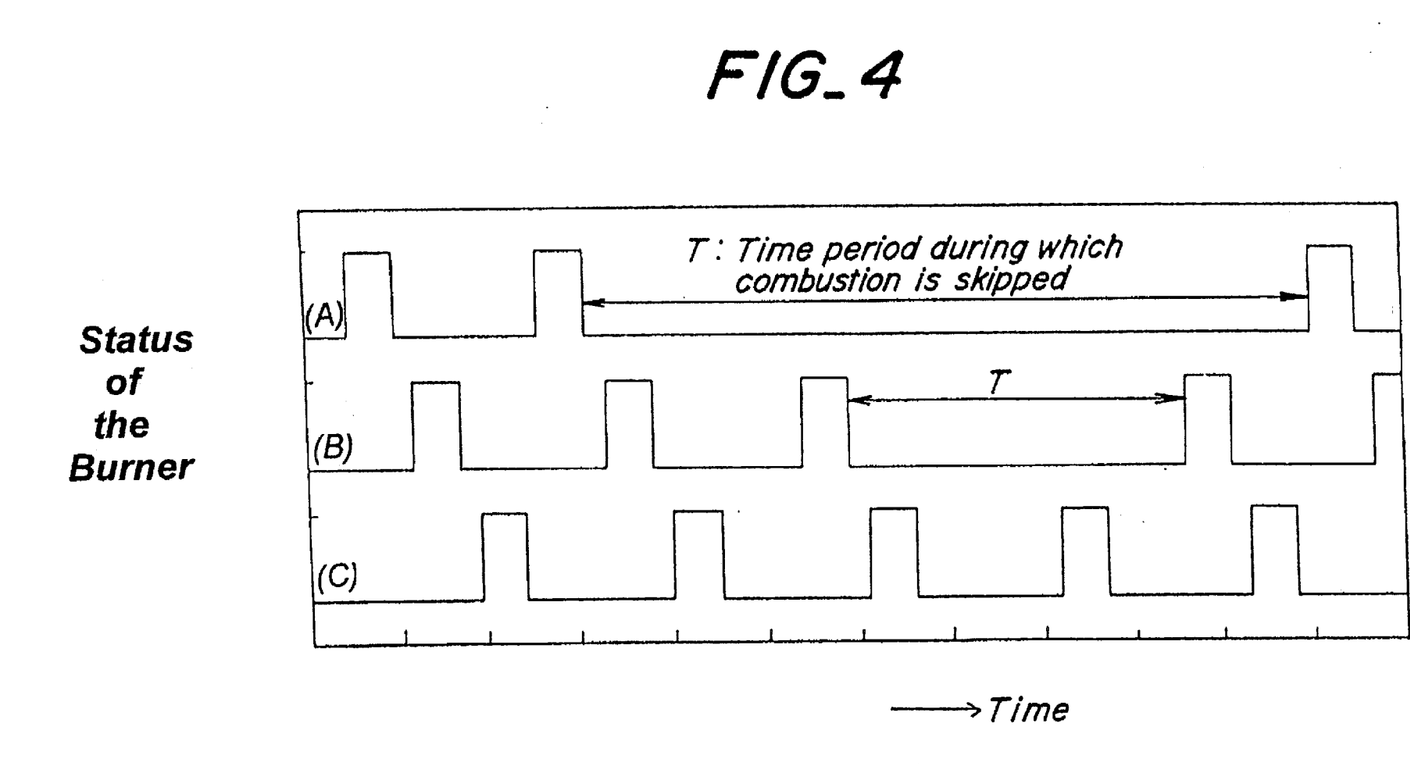
FIG. 4 is a time chart for illustrating a burner combustion-controlling process according to a second aspect of the present invention.

According to the second aspect of the present invention, the temperature sensor is fitted in each control zone. With respect to the control zone in which the temperature detected by this temperature sensor exceeds the preset temperature, the burner in that control zone is skipped over through combustion preset for a given time period. FIG. 4 shows a concrete example of such controlling. For example, if the temperature in the control zone at the upper stage of the furnace exceeds the preset temperature and when time comes to subject the burner 2 at the upper stage to combustion, the burner is skipped over through combustion at this time, as represented in plot (A). If the detected temperature becomes lower than the preset temperature, combustion of the burner 2 begins to be effected. FIG. 4 shows similar controlling with respect to the burner 3 at the intermediate stage, as shown in plot (B). According to this control process, the burner or burners are skipped through combustion at given time period(s), but the overall intermittent combustion cycle is maintained as a whole.

When the combustion is controlled with respect to the burners as mentioned above, the advantage obtained when the burners in plural control zones are successively subjected to combustion for given short time period without throttling the burners is maintained as it is, and the disadvantage occurring when the combustion outputs of the burners are throttled is avoided. In addition, since the combustion of the burners can be controlled with respect to each of the control zones, variation in the temperature distribution inside the furnace can be reduced.

Figure 5:
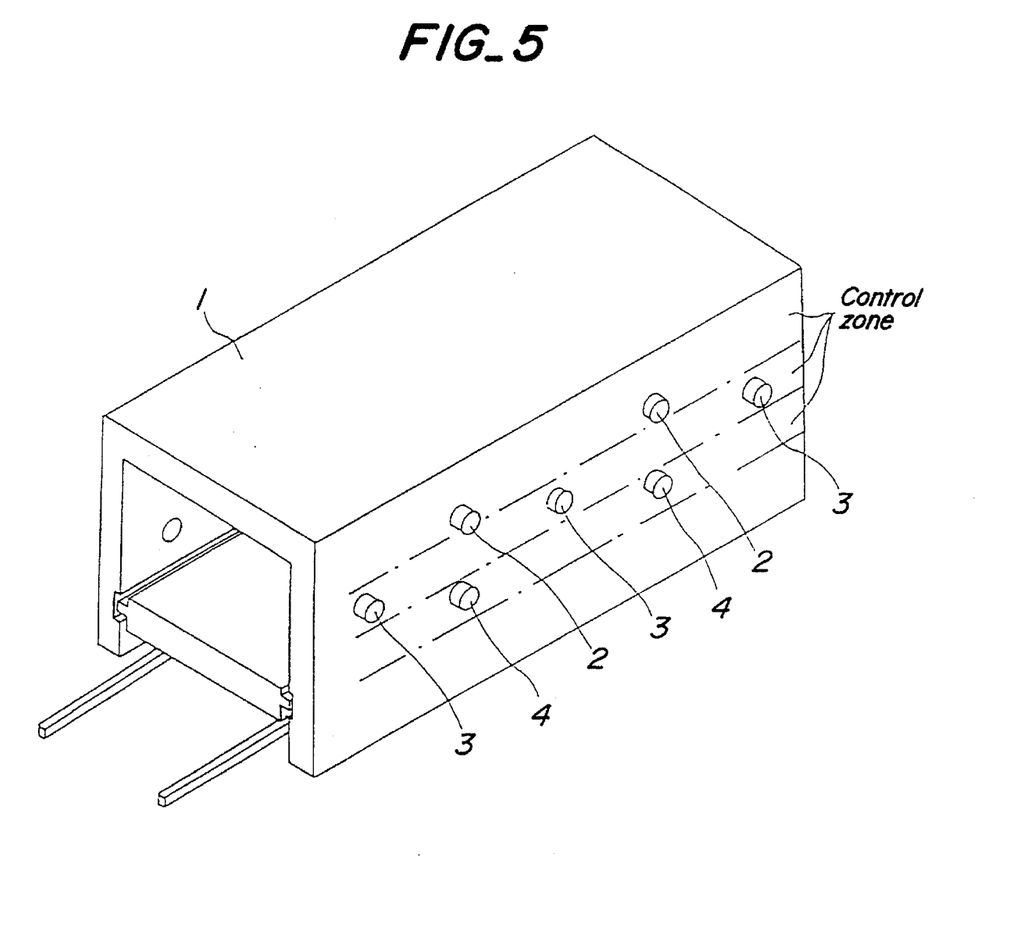
FIG. 5 is a perspective view of another embodiment of the present invention.

In the above embodiments, a single burner is arranged in each of the control zones. However, as shown in FIG. 5, the furnace body 1 is divided into three, i.e., upper, intermediate and lower control zones, and a plurality of burners 2, 3, 4 may be arranged in each control zone. In this case, those burners belonging to the same control zone are controlled together. Although a plurality of the control zones are arranged vertically in the above embodiments, such control zones may be defined in a lateral direction of the furnace body. A single temperature sensor may be arranged for every control zone or for every burner.

For example, a single furnace in which eight burners were arranged in each of the control zones at the upper, intermediate and lower stages, respectively, was used, the temperature in the furnace was set at 350° C., and a difference in the temperature distribution between an upper portion and a lower portion was measured. As a result, it was made clearer that the temperature difference was 121° C. in the case of the conventional combustion-controlling process as shown in FIG. 6, whereas the temperature difference was reduced to 83° C. in the case of the combustion-controlling process according to the first aspect of the present invention.

As mentioned above, according to the burner combustion-controlling process and apparatus of the present invention, the variation in the temperature distribution inside the furnace can be diminished without damaging the advantage in the conventional intermittent burner combustion-controlling process. Accordingly, the invention process is favorably adopted to control the combustion of the burners in the furnace for firing the ceramic articles which are likely to be damaged by temperature differences.

What is claimed is:

1. A process for controlling combustion of burners arranged in a plurality of respective control zones divided inside a furnace, said process comprising the step of repeating a cycle of successively subjecting said burners to combustion for a short time, wherein at least one temperature sensor is fitted in each control zone, a time period during which each burner is subjected to combustion is controlled according to a difference between a temperature detected by the corresponding temperature sensor and a preset temperature in a respective control zone.

2. The controlling method according to claim 1, wherein if there is a control zone in which the detected temperature combustion of exceeds said preset temperature, the burner in said control zone is skipped over for a given time period during which the burner is to be subjected to combustion.

3. A burner combustion-controlling apparatus for controlling combustion of burners provided in respective control zones defined by dividing an interior of a furnace through repeating a cycle of successively subjecting the burners to combustion for a short time, said apparatus including means for feeding air to each of the burners, means for feeding a fuel gas to each of the burners, adjusting means for adjusting the air feeding means and the fuel feeding means, means for detecting a temperature in each of the control zones, comparison means for memorizing a preset temperature in each of the control zones, comparing the preset temperature with the detected temperature in each of the control zones, and outputting a signal based on a comparison result, and intermittent combustion-controlling means for receiving said signal from the comparison means and outputting a signal to a burner-controlling means, said burner-controlling means adapted for receiving said signal from said intermittent combustion-controlling means and outputting a signal to said adjusting means to control feeding air and the fuel gas to each of the burners, said intermittent combustion-controlling means being adapted to output signals to said burner controllers to effect subjecting the burners to combustion in a preset circulating manner at a given interval and to adjust a time period during which each burner is subjected to combustion, depending upon a difference between the temperature of said detecting means and the preset temperature.

4. The apparatus according to claim 3, wherein if there is a control zone in which the detected temperature combustion of exceeds the preset temperature, the burner in said control zone is skipped over for a given time period during which the burner is to be subjected to combustion.

* * * * *